Nov. 24, 1959  W. C. PIERCE ET AL  2,914,714
PERMANENT MAGNET TORQUE PRODUCING DEVICE
Filed Feb. 23, 1955  2 Sheets-Sheet 1
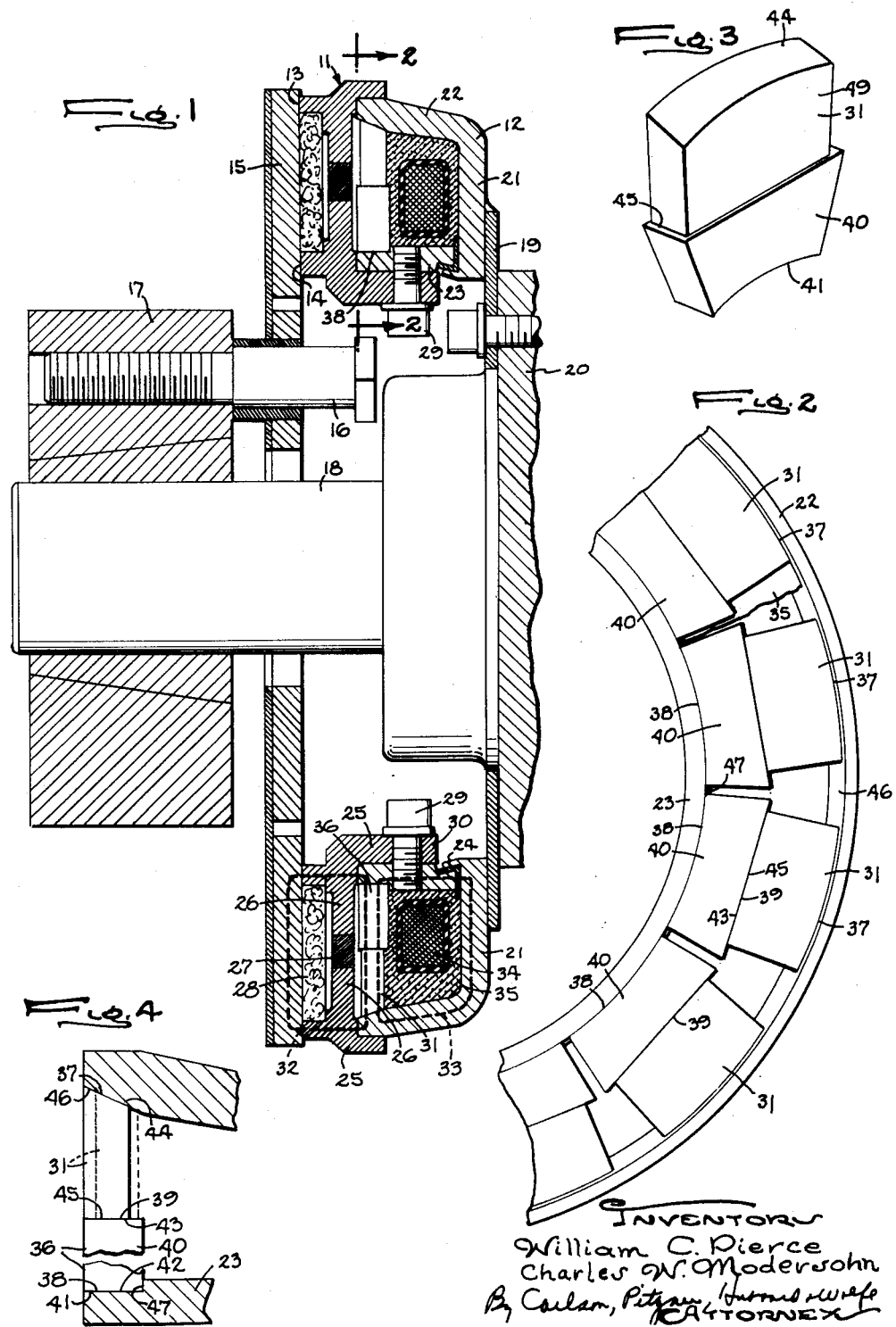
INVENTORS
William C. Pierce
Charles W. Modersohn
By Carlson, Pitzner,
ATTORNEY Nov. 24, 1959 W. C. PIERCE ET AL 2,914,714
PERMANENT MAGNET TORQUE PRODUCING DEVICE
Filed Feb. 23, 1955 2 Sheets-Sheet 2
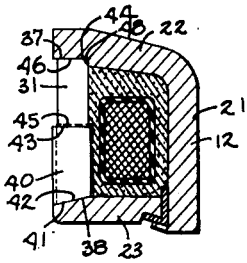
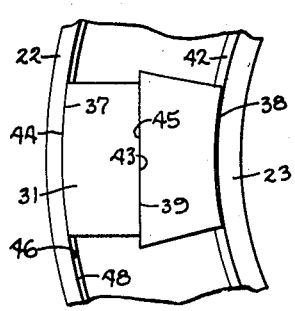
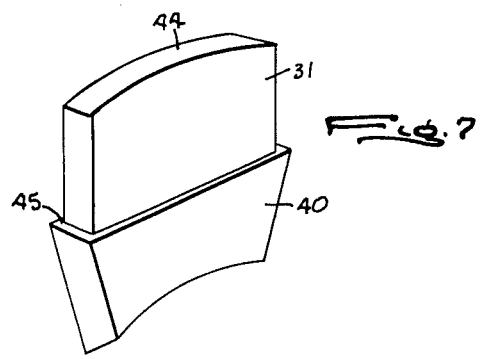
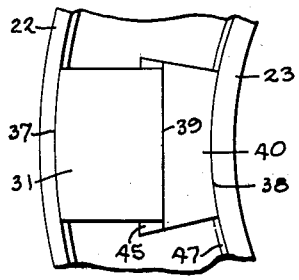
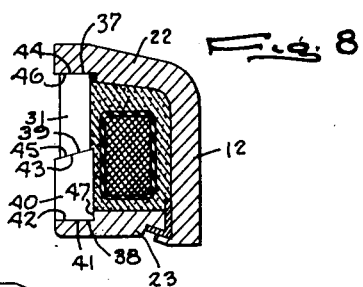
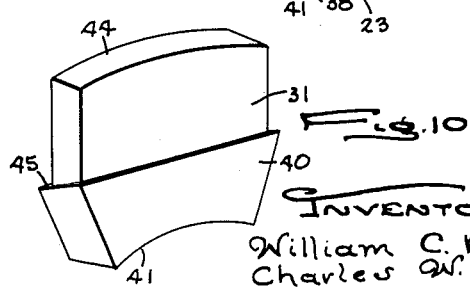
INVENTORS
William C. Pierce
Charles W. Modersohn
By Carlson, Pitzner, Hubbard & Wolfe
ATTORNEYS

United States Patent Office 2,914,714
Patented Nov. 24, 1959

2,914,714

PERMANENT MAGNET TORQUE PRODUCING DEVICE

William C. Pierce and Charles W. Modersohn, Beloit, Wis., assignors to Warner Electric Brake & Clutch Company, Beloit, Wis., a corporation of Wisconsin Application February 23, 1955, Serial No. 489,865

9 Claims. (Cl. 317—201)

This invention relates generally to a magnetic torque producing device in which the active magnetic force for coupling the driving and driven elements of the device together is derived from a permanent magnet which is rendered ineffective by energization of an associated winding. More particularly, the invention relates to such a torque device in which the magnet core proper includes an annulus of channel cross-section having spaced pole projections and the permanent magnet is a separately formed block interposed in a closed magnetic connection or flux path spanning the pole projections. Due to the expensive character and poor machinability of available permanent magnet materials, the cost of torque devices of the above character is considerably higher than similar coil controlled devices.

The primary object of the invention is to provide a permanent magnet device of the above character in which substantially complete closure of the flux path at both poles of the permanent magnet is achieved without accurate dimensioning of the permanent magnet block thereby reducing the cost of the magnet member.

Another object is to construct the permanent magnet connection in a novel manner such that the block of permanent magnet material may be formed with one flat end which need not be spaced accurately from the other end.

A more detailed object is to bridge the pole projections by two blocks, one composed of permanent magnet material and abutting one end of the second block, the surfaces of the magnetic joint at one end of one of the blocks being beveled so as to lie in full abutment with the other in different positions of longitudinal alinement of the two blocks.

Other objects and advantages of the invention will become apparent from the following detailed description taken in connection with the accompanying drawings, in which Figure 1 is a diametrical cross-sectional view of a preferred form of a magnetic torque producing device embodying the novel features of the present invention.

Fig. 2 is a fragmentary face view of a part of the magnet member taken along the line 2—2 of Fig. 1.

Fig. 3 is a perspective view of the permanent magnet and a cooperating spacer member.

Fig. 4 is a fragmentary enlarged view of a part of Fig. 1 showing different positions of the permanent magnet.

Figs. 5, 6 and 7 respectively are views similar to Figs. 1, 2 and 3 and show a modified form of the invention.

Figs. 8, 9 and 10 respectively are views similar to Figs. 5, 6 and 7 and show a further modification.

In the drawings, the invention is shown for purposes of illustration embodied in a permanent magnet friction brake including a stationary magnet member 11 having a shell or core 12 of magnetic material of channel cross-section and radially spaced concentric pole faces 13 and 14. The latter are adapted for axial gripping engagement with an armature 15 which, herein, is a flat ring of magnetic material spanning the pole faces and supported for axial movement relative thereto on a plurality of pins 16 spaced angularly around a support 17 fast on a rotatable shaft 18.

To mount the magnet member 11 stationarily, a plate 19 bolted to a fixed support 20 is welded to a flat ring 21 which constitutes the closed end of the core 12. At its peripheries, the ring 21 respectively is formed integral with the inner end of a cylindrical outer pole projection 22 and is secured to the inner end of a separately formed cylindrical inner pole projection 23 concentric with the outer projection, the ring 21 and the inner projection being secured together by a thin flange 24 projecting from the ring and clenched around an undercut surface of the projection. At their outer ends, the pole projections 22 and 23 telescope closely with the inner sides of the inner ends of two generally cylindrical pole pieces 25 which terminate at their outer ends in the pole faces 14 and 13. Integral flanges 26 projecting radially toward each other from intermediate portions of the pole pieces 25 are connected rigidly together by a nonmagnetic ring 27 so that the pole pieces may be removed from the core 12 and replaced as a unit when the pole faces and a ring 28 of wear material seated between and flush with the pole faces become worn out. Bolts 29 threaded radially into the inner pole projection 23 extend through an axial extension 30 of the inner pole piece 25 to clamp the pole piece unit removably to the core 12 with the flanges 26 abutting the ends of the pole projections 22 and 23 axially.

Magnetic flux for drawing the working faces of the magnet member 11 and the armature 15 into frictional gripping engagement is derived from a permanent magnet 31 arranged transversely between the pole projections 22 and 23 adjacent their outer ends so that its flux is divided between two circuits indicated by the dotted lines 32 and 33 in Fig. 1. A main one 32 of these flux paths extends from the poles of the permanent magnet through the pole projections 22 and 23 and the pole pieces 25 and axially back and forth between the armature and the pole faces 14 and 13. The other or auxiliary path 33 extends from the permanent magnet poles through the pole projections and around the closed end 21 of the core 12. To release the brake, an annular multiple turn winding 34 secured in the core between the closed end thereof and the permanent magnet by a suitable hardened cement 35 is energized to produce a magnetic potential across the pole faces opposing and effectually cancelling that of the permanent magnet.

In the present instance, the permanent magnet 31 is formed as a plurality of generally rectangular blocks or bars extending radially of the pole projections 22 and 23 and fitting between one of the latter and a magnetic spacer ring 36 which is formed of magnetic material like that of the core 12 and constitutes a part of the latter. Radially opposed surfaces on the pole projections, the spacer ring, and the permanent magnet bars abut each other to define outer, inner and intermediate magnetic joints 37, 38 and 39 which complete a magnetic connection or flux circuit between the pole projections and through the permanent magnet. While the spacer ring 36 may be continuous and extend completely around the pole projections, it is preferred to simplify the construction of the ring by interrupting the same to form a plurality of segments or blocks 40 corresponding in number to the permanent magnet bars 31 and spaced angularly around the core.

The present invention contemplates a novel construction of the permanent magnet bars 31 and the core parts including the spacer segments 40 to achieve substantially complete closure of the magnetic connections through the magnet bars while permitting variation in the lengths of the latter transversely of the pole projections 22 and 23. For this purpose, the abutting surfaces of one of the joints 37, 38 and 39 in each magnetic connection are beveled so that the effective radial length of the permanent magnet bar in the connection varies as it is inserted different distances into the recess defined by one pole projection and the cooperating segment 40 and assumes different positions of longitudinal alinement with the segment. To provide abutment of the full area of the ends of each magnet bar 31 with the opposing pole projection and segment surfaces and thereby maintain a substantially uniform flux density at the poles of the magnet bars in their different positions axially of the pole projections, the opposing surfaces abutting the ends of each bar are made wider axially than the thickness of the bars in the same direction.

In the preferred form of the invention shown in Figs. 1 to 4, the permanent magnet bars 31 are wedge-shaped with their outer ends 44 beveled and lying on a conical surface concentric with the core axis and the opposed inwardly facing surface 46 of the outer pole projection 22 against which the bars abut to define the outer joint 37 lies on the same conical surface. At their inner ends 43, the bars abut outer ends 45 of the magnetic segments 40 to define the intermediate joint 39. To simplify the finishing of the inner bar ends 43, the latter and the opposing segment ends 45 are made flat to lie in planes parallel to the core axis. The inner segment ends 41 and the opposed outwardly facing surface 42 on the inner pole projection 23 defining the inner joint 38 lie on a cylinder concentric with the core axis.

In the present instance, the magnet bars 31 are made as castings of an alloy of aluminum, nickel and cobalt sold under the trade-name of "Alnico" and their radially facing ends 43 and 44 are finished to the desired size and contour by grinding operations. In the finishing of each magnet bar 31 after the same is cast, either of the parallel sides 49 thereof is ground flat to provide a reference surface for the final grinding operation of the ends 43 and 44. The parts of the core 12 including the spacer segments 40 are formed of a mild steel or soft iron such as annealed ingot iron, preferably, by sheet metal stamping operations. The opposed surfaces 42 and 46 of the pole projections 22 and 23 are finished by grinding operations.

To complete the assembly of the parts of the magnet member 11 after the inner pole projections 22 and 23 have been secured together and the opposed surfaces 42 and 46 thereof have been machined, the core is supported horizontally in an upwardly opening position and the winding 34 is seated between the pole projections and partially covered with the cement 35. Then, each permanent magnet bar 31 and its associated spacer segment 40 with their flat ends 43 and 45 in abutment are shifted sidewise and along the core axis between the pole projections to bring their curved ends 44 and 41 into axial abutment with the conical and cylindrical core surfaces 42 and 46.

Inward movement of the segment 40 is limited by abutment with the shoulder 47 on the inner pole projection 23 while the beveled permanent magnet bar 31 is shifted inwardly until it fits tightly between the conical core surface 46 and the flat segment end 45. Since the latter and the conical surface are wider axially than the bar and due to the bevel on the outer pole projection and the bar, the bar may fit tightly in different axial positions between those shown in full and in phantom in Fig. 4 in spite of variations in its radial length. The permissible variation in radial length of each permanent magnet bar depends on the axial width of the conical surface 46 and the angle of convergence of this surface with the core axis. Such angle preferably is large enough to provide a wide range of permissible bar lengths with some locking of each bar and its segment between the pole projections and, in this instance, is around 15 degrees or equal approximately to the locking angle of the materials used. After each magnet bar and its segment have been pressed between the pole projections, cement 35 in its liquid state is poured into the core between adjacent magnet bars and to a level substantially flush with the outer sides of the segments and is permitted to harden before the completely assembled magnet member is removed from its support, such cement holding the magnet bars and segments as well as the winding in their assembled positions.

Instead of the magnet bars 31, the spacer segments 40 may be wedge-shaped as shown in the modification of Figs. 5 to 7. In this case, the opposed surfaces 44 and 46 of the outer magnetic joint 37 are made cylindrical and the surfaces 41 and 42 of the inner magnetic joint 38 are beveled. As in the preferred construction, the abutting ends 43 and 45 of each permanent magnet bar and its segment are flat and lie in a plane parallel with the core axis. Also, each bar is thinner axially than the opposed surfaces 46 and 45 of the outer pole projection and the spacer segment. The permanent magnet bars are seated against a shoulder 48 on the outer pole projection 22 and the cooperating segments 40 shift axially into different positions such as those shown in full and in phantom in Fig. 5 to compensate for the different radial lengths of magnet bars.

In the modified construction of Figs. 8 to 10, both the magnet bars 31 and the spacer segments 40 are wedge-shaped, the opposed surfaces 44 and 46 of the outer magnetic joint 37 and the surfaces 41 and 42 of the inner joint 38 being cylindrical while the surfaces 43 and 45 defining the intermediate joint 39 are beveled. These beveled surfaces are flat as in the preferred construction of Figs. 1 to 4 and the modification of Figs. 5 to 8, but lie in a plane intersecting rather than paralleling the core axis. The spacer segments 40 seat against the shoulder 47 while the magnet bars shift axially into different positions of longitudinal alinement with the segments as in the preferred construction.

It will be apparent from the foregoing that, due to the permissible range of variation of the radial lengths of the permanent magnet bars 31 resulting from their wedging fit between the pole projections 22 and 23, the bars may be finished easily in few grinding operations in spite of the poor machinability of the permanent magnet material thereby reducing the total cost of the magnet member 10. The bevel on the radially opposed surfaces of the core 12 and the magnet bars also simplifies assembly of the magnet member by facilitating insertion of each magnet bar and its cooperating segment 40 between the pole projections.

We claim as our invention:

1. In a magnetic torque producing device, the combination of, an annular core of magnetic material of channel cross-section having radially spaced inner and outer pole projections concentric with each other, a magnetic member abutting radially against the outer surface of said inner projection to form a magnetic joint and extending from the projection toward but short of said outer projection, the inner periphery of said outer projection adjacent one end thereof and opposite said member being chamfered to provide a conical surface concentric with and flaring outwardly along the axis of said core, and a radially disposed bar of permanent magnet material spanning and abutting at opposite ends against said conical surface and said member, said bar having a conical outer end in full abutment with said conical surface of said outer projection.

2. In a magnetic torque producing device, the combination of, an annular core of magnetic material of channel cross-section having radially spaced inner and outer pole projections formed with opposed radially facing surfaces, a radially disposed bar element of magnetic material abutting one of said surfaces radially and extending therefrom toward but short of the other surface, a radially disposed bar element of permanent magnetic material spanning said magnetic element and the other of said surfaces and abutting the two at opposite edges of the permanent magnet bar element, the mating surfaces of said inner pole projection and the bar element abutting the same lying on a common conical surface concentric with the axis of the core.

3. In a magnetic torque producing device, the combination of, an annular core of magnetic material of channel cross-section having radially spaced inner and outer pole projections formed with concentric inner and outer cylindrical surfaces facing radially toward each other, a radially disposed spacer element of magnetic material having a cylindrical end surface abutting radially against one of said pole surfaces to form a magnetic joint and extending radially therefrom toward but short of the other of said pole surfaces, and a radially disposed bar of permanent magnet material spanning said element and said other pole surface and having a cylindrical end surface abutting the latter radially to form a second magnetic joint, the adjacent end surfaces of said bar and said element abutting each other to form a third magnetic joint and lying in a common plane disposed at an angle with respect to the axis of said core to provide full abutment of the surfaces of all of said joints by pressing of the bar and the element axially between said projections.

4. The combination of, two magnetic pole projections having opposed arcuate surfaces spaced from each other, and a closed magnetic connection bridging said surfaces including two magnetic blocks abutting each other at their adjacent ends and said surfaces at the respective outer ends whereby to form three abutment joints of substantial areas, one of said blocks being composed of permanent magnet material and the surfaces of the joint at one end of such block being beveled and thus adapted for full abutting engagement in different relative positions of longitudinal alinement of the two blocks.

5. In a permanent magnet torque producing device, the combination of, an annular core of magnetic material of channel cross-section having radially spaced concentric parts, radially opposed and nonparallel annular surfaces on said core parts, and a rigid piece of permanent magnet material spanning and abutting at opposite edges against said surfaces to form magnetically closed joints, the mating surfaces of one of said joints being beveled and disposed at an angle relative to the axis of said core and the surfaces of the other joint to provide tight closure of the two joints by wedging movement of said piece axially between said surfaces.

6. In a permanent magnet torque producing device, the combination of, an annular core member of magnetic material and channel cross-section having radially spaced pole projections providing radially opposed surfaces adjacent their outer ends, a radially disposed piece of magnetic material abutting one of said surfaces to form a first magnetic joint and extending radially therefrom toward the other surface and partially across the space between the surfaces, and a radially disposed piece of permanent magnet material spanning said magnetic piece and said other surface and abutting the two at opposite radially facing edges of the permanent magnet piece to form magnetically closed joints cooperating with said first joint to define a closed flux path between said pole projections and through said pieces, the mating surfaces of at least one of said joints being beveled and disposed at an angle relative to the axis of said annular member and said radially facing surfaces on said pole projections and said magnetic piece extending axially farther than the axial thickness of said permanent magnet piece.

7. In a permanent magnet torque producing device, an annular member of magnetic material of channel cross-section having spaced parts formed with opposed annular surfaces, a piece of magnetic material abutting one of said surfaces to provide a first magnetic joint and extending therefrom toward the other surface and partially across the space between the surfaces, and a piece of permanent magnet material spanning said other surface and said magnetic piece and abutting the two at oppositely facing edges of the permanent magnet piece to form magnetically closed joints cooperating with said first joint to define a closed flux path extending between said member parts and through said pieces, the mating surfaces of one of said joints being beveled and disposed at an angle with the mating surfaces of at least one of the other joints and the oppositely facing edges of said permanent magnet piece being narrower than the opposing surfaces of said magnetic piece and said channel member.

8. In a permanent magnet torque producing device, the combination of, an annular core member of magnetic material and channel cross-section having radially spaced pole projections providing radially opposed surfaces adjacent their outer ends, a radially disposed piece of magnetic material abutting one of said surfaces to form a first magnetic joint and extending radially therefrom toward the other surface and partially across the space between the surfaces, and a radially disposed piece of permanent magnet material spanning said magnetic piece and said other surface and abutting the two at opposite radially facing edges of the permanent magnet piece to form magnetically closed joints cooperating with said first joint to define a closed flux path between said pole projections and through said pieces, the mating surfaces of at least one of said joints being beveled to provide a tight fit of said pieces between said pole projections in different positions of radial alinement of the pieces.

9. The combination of, two magnetic pole projections having opposed arcuate surfaces spaced from each other, and a closed magnetic connection bridging said surfaces including two magnetic blocks abutting each other at their adjacent ends and said surfaces at the respective outer ends whereby to form three abutment joints of substantial areas, one of said blocks being composed of permanent magnet material and the surfaces of one of said joints being beveled and thus adapted for full abutting engagement in different relative positions of longitudinal alinement of the two blocks.

References Cited in the file of this patent

UNITED STATES PATENTS

| | | |
|---|---|---|
| 2,381,763 | McCreary | Aug. 7, 1945 |
| 2,566,850 | Mott | Sept. 4, 1951 |
| 2,724,075 | Van Urk et al. | Nov. 15, 1955 |